United States Patent

Kawabe et al.

[11] Patent Number: 5,146,969
[45] Date of Patent: Sep. 15, 1992

[54] AIR FILLING APPARATUS FOR TIRE

[75] Inventors: Hiroshi Kawabe; Toshiyuki Watanabe, both of Kodaira, Japan

[73] Assignee: Bridgestone Corporation, Tokyo, Japan

[21] Appl. No.: 788,948

[22] Filed: Nov. 7, 1991

[30] Foreign Application Priority Data

Nov. 7, 1990 [JP] Japan .................................. 2-299978

[51] Int. Cl.$^5$ ............................................. B60C 25/06
[52] U.S. Cl. ........................................ 157/1.1; 157/1.2
[58] Field of Search ........................ 157/1.0, 1.1, 1.17, 157/1.2

[56] References Cited

U.S. PATENT DOCUMENTS

| | | | |
|---|---|---|---|
| 2,762,424 | 9/1956 | Zito | 157/1.2 X |
| 3,700,021 | 10/1972 | Motis | 157/1.1 |
| 5,072,765 | 12/1991 | Kane et al. | 157/1.1 |

FOREIGN PATENT DOCUMENTS

| | | |
|---|---|---|
| 33305 | 2/1955 | Japan . |
| 53-3527 | 1/1978 | Japan . |
| 53-23563 | 7/1978 | Japan . |

Primary Examiner—D. S. Meislin
Attorney, Agent, or Firm—Sughrue, Mion, Zinn, Macpeak & Seas

[57] ABSTRACT

An apparatus for filling pressurized air into a tire includes a table for supporting thereon a tire mounted on a rim, an inner cylinder member air-tightly engageable with a flange of the rim, and an outer cylinder member air-tightly engageable with a side rubber of the tire and forming an air-tight space in cooperation with the inner cylinder member. The end face of the outer cylinder member air-tightly engageable with the side rubber of the tire is inclined to the rotating axis of the tire. Therefore, the bead portion of the tire needs only to get over the part of the hump of the rim positioned oblique relative thereto along its circumference little by little during filling pressurized air into the tire. As a result, the bead portion of the tire is only subjected to a little deformation and comes into close contact with the rim, the bead portion of the tire substantially uniformly closely contacts the rim. Therefore, the tire filled with pressurized air in this manner is in a complete state fully exhibiting its performance.

2 Claims, 4 Drawing Sheets

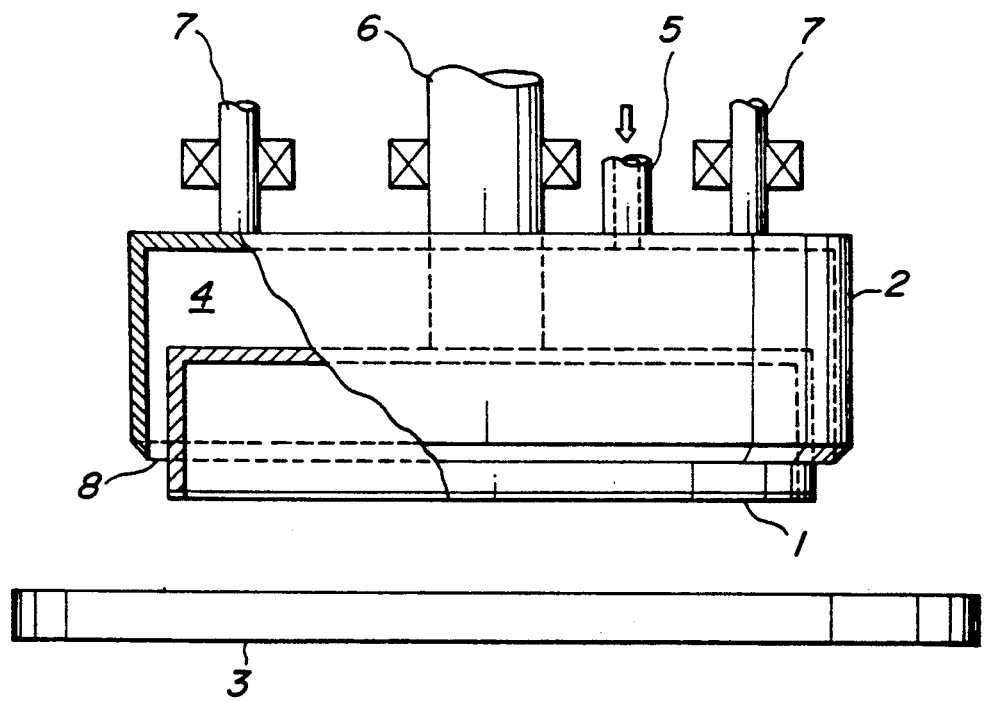
FIG_1
*PRIOR ART*

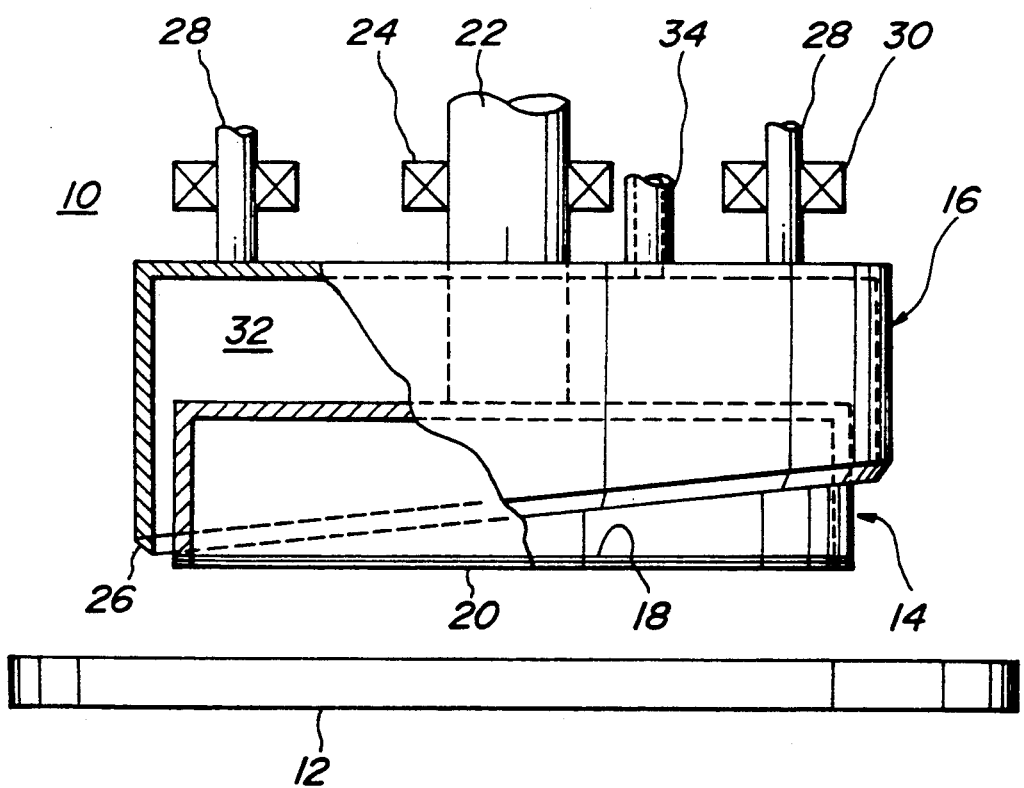
FIG_2

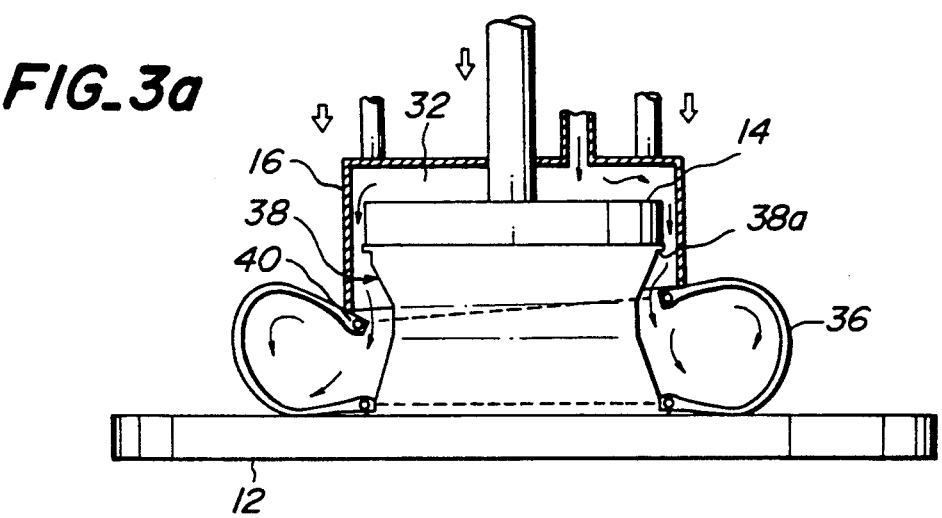
FIG_3a
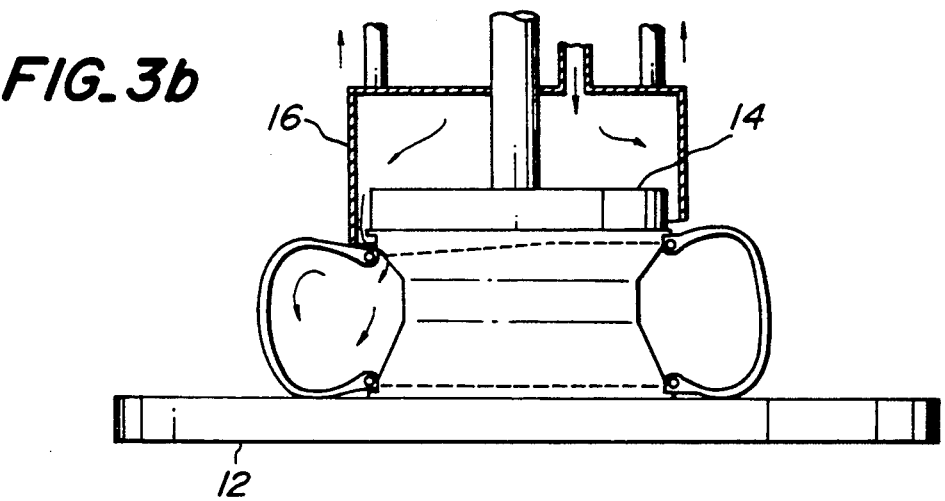
FIG_3b
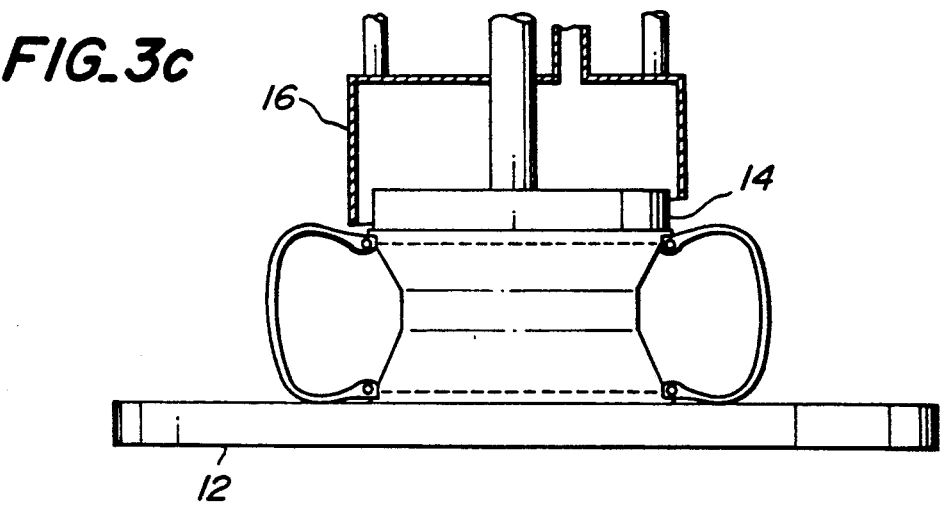
FIG_3c

FIG_4a
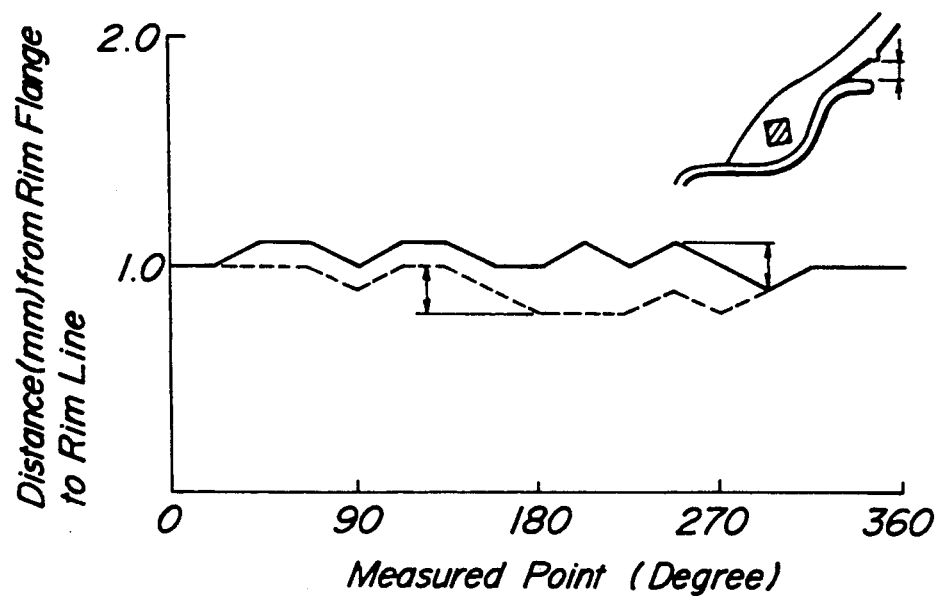
FIG_4b
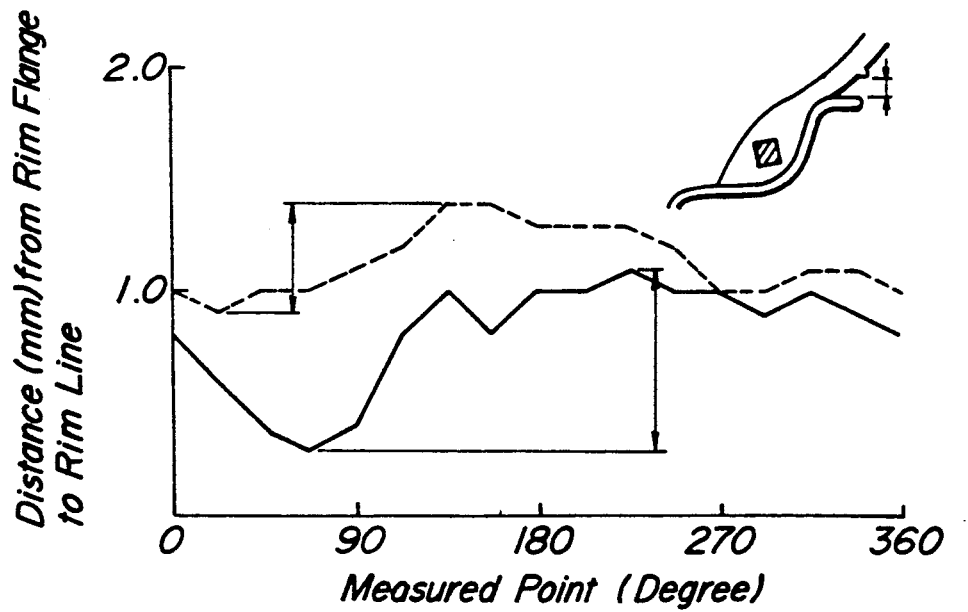

AIR FILLING APPARATUS FOR TIRE

BACKGROUND OF THE INVENTION

This invention relates to an apparatus for filling pressurized air into a tire mounted on a rim, and more particularly to an air filling apparatus capable of bringing a bead portion of a tire into close contact with a rim just when pressurized air has been filled in the tire mounted on the rim.

An apparatus for filling pressurized air into a tire mounted on a rim has been disclosed, for example, in Japanese Patent Application Publication No. 53-23,563. This disclosed prior art apparatus includes a disc-shaped air-tight plate 1 and an air-tight ring 2 which are coaxially and telescopically movable relative to each other and toward and away from a table 3 as schematically shown in FIG. 1.

In filling pressurized air into a tire (not shown) previously mounted on a rim by the use of this prior art apparatus, the tire with the rim is first arranged on the table 3 such that the rotating axis of the tire is coaxial to the axis of the air-tight ring 2. The air-tight plate 1 and the air-tight ring 2 are then engaged in an air-tight manner with a flange of the rim and a side surface rubber of the tire, respectively, while pressurized air is supplied into the air-tight space 4 formed between the air-tight plate and ring 1 and 2 through a supply tube 5 so that the pressurized air is filled in the internal space in the tire through the clearance between the rim and a bead portion of the tire temporarily for a period of time.

Thereafter, the table is lowered, while the air-tight space 4 is air-tightly maintained until the engagement between the air-tight ring 2 and the side surface rubber of the tire is released, thereby completely filling the pressurized air into the tire. Reference numerals 6 and 7 denote rod members whose ends are connected to the telescopically arranged air-tight plate 1 and ring 2, respectively, and the other ends are connected to conventional cylinders (not shown). The air-tight plate 1 and ring 2 are moved in rotating axial directions of the tire relative to the table 3 individually in response with actuations of the rod members 6 and 7.

With this arrangement of the known apparatus, the end face 8 of the air-tight ring 2 is arranged substantially in parallel with the side surface rubber of the tire arranged on the table 3 or substantially in parallel with a plane perpendicular to the rotating axis of the tire. Therefore, when the table 3 is being lowered, the end face 8 of the air-tight ring 2 is maintained in close contact with the side surface rubber of the tire over the whole its circumference until the end face 8 is disengaged from the side surface rubber of the tire.

Therefore, when the tire is being filled with pressurized air, the whole circumference of the bead portion of the tire must instantaneously get over or ride over the hump of the rim. In other words, it is required to supply a pressurized air of, for example, 4 to 6 kg/cm² which is higher than a set pressure of 3 to 5 kg/cm² into the air-tight space and hence the internal space of the tire for a predetermined time, in order to overcome the resistance caused when the whole circumference of the bead portion of the tire rides over the hump of the rim instantaneously. Consequently, the bead portion of the tire is expanded or deformed radially outwardly and may be plastically deformed as the case may be. On the other hand, it is actually difficult to disengage the end face of the air-tight ring from the side surface rubber of the tire uniformly over its whole circumference, and further it is impossible to bring the tire bead portion into in close contact with the rim over its whole circumference. Therefore, tires filled with pressurized air having required performances cannot be obtained by the use of the apparatus of the prior art.

SUMMARY OF THE INVENTION

It is an object of the invention to provide an air filling apparatus for a tire, which eliminates all the disadvantages of the prior art and which is able to bring a bead portion of a tire into close contact with a rim over its whole circumference as a unitary body.

In order to accomplish this object, in an air filling apparatus for a tire, including a table for supporting thereon a tire mounted on a rim, an inner cylinder member air-tightly engageable with a flange of the rim, and an outer cylinder member air-tightly engageable with a side rubber of the tire and forming an air-tight space in cooperation with the inner cylinder member for filling pressurized air into the tire, while the outer cylinder member being moved relative to the inner cylinder member in the rotating axial direction of the tire, according to the invention the end face of the outer cylinder member air-tightly engageable with the side rubber of the tire is inclined to the rotating axis of the tire.

The end face of the outer cylinder member is preferably an inclined surface whose difference in height is 5 to 20 mm in the direction of the rotating axis of the tire.

As the end face of the outer cylinder member to be in air-tight contact with a side surface rubber of a tire is oblique to the rotating axis of the tire, a bead portion of the tire assumes an oblique position relative to a hump formed on a rim over its entire circumference corresponding to the bead portion of the tire when pressurized air is supplying into the tire.

Therefore, the bead portion of the tire needs only to ride over the part of the hump of the rim positioned obliquely relative thereto. In other words, the bead portion of the tire needs only to ride over the hump along its circumference little by little. As a result, the bead portion of the tire is only subjected to a little deformation. As the bead portion of the tire rides over the hump of the rim little by little and comes into close contact with the rim, the bead portion of the tire substantially uniformly closely contacts the rim.

The invention will be more fully understood by referring to the following detailed specification and claims taken in connection with the appended drawings.

BRIEF DESCRIPTION OF THE DRAWINGS

FIG. 1 is a view illustrating partially in section a principal part of the air filling apparatus of the prior art;

FIG. 2 is a view illustrating partially in section a principal part of the apparatus according to the invention;

FIGS. 3a, 3b and 3c are explanatory views illustrating steps for filling pressurized air into a tire by means of the apparatus according to the invention, respectively;

FIG. 4a is a graph illustrating change in distance at circumferential positions from the rim flange to the rim line of a tire filled with pressurized air by means of the apparatus according to the invention; and FIG. 4b is a graph illustrating change in distance at circumferential positions from the rim flange to the rim line of a tire filled with pressurized air by means of the apparatus of the prior art.

DESCRIPTION OF THE PREFERRED EMBODIMENTS

FIG. 2 illustrates an air filling apparatus of a preferred embodiment according to the invention in a partially removed front elevation. The apparatus 10 comprises a table 12 for supporting a tire mounted on a rim but not yet filled with pressurized air, and an inner cylinder member 14 and an outer cylinder member 16 in opposition to the table 12. The inner and outer cylinder members 14 and 16 are coaxially arranged in a telescopic relationship.

The inner cylinder member 14 has a flat surface portion 18 facing to a flange of the rim when the tire with the rim is arranged on the table 12. A seal member 20 made of a rubber or rubber-like elastic material is attached to the flat surface portion 18 so as to be in airtight contact with the flange of the rim over its entire circumference. The inner cylinder member 14 is connected on the side remote from the table 12 to a conventional cylinder (not shown) through a rod member 22 so that the inner cylinder member 14 is movable toward and away from the table 12 in response to the actuation of the cylinder. Reference numeral 24 denotes a known type bearing for supporting the rod member 22 and hence the inner cylinder member 14 slidably in directions substantially perpendicular to the table 12.

The outer cylinder member 16 has an inner diameter larger than the outer diameter of the inner cylinder member 14 and supports the rod member 22 attached to the inner cylinder member 14 in a slidable air-tight manner. Secured to the surface of the outer cylinder member 16 remote from the table 12 are respective one ends of rod members 28 whose other ends are connected to cylinders (not shown) separate from the cylinder associated with the rod member 22. The outer cylinder member 16 is movable toward and away from the table in response to the actuation of the cylinders independently from the movement of the inner cylinder member 14.

The rod members 28 are supported by bearings 30 so as to be slidable in directions substantially perpendicular to the table 12. As shown in FIG. 2, the annular end face 26 of the outer cylinder member 16 is inclined to the table 12 or the rotating axis of the tire to be arranged on the table 12 according to the invention. The inner and outer cylinder members 14 and 16 form an air-tight space 32 with the aid of air-tight contacts between the annular end face 26 of the outer cylinder member 16 and the side surface rubber of the tire mounted on the rim arranged on the table 12 and between the rim flange and the seal member 20 provided on the end of the inner cylinder member 14. Pressurized air is supplied into the air-tight space 32 through a supply tube 34 having a reducing valve and connected to a pressurized air source such as a compressor.

The operation for filling pressurized air into the tire mounted on the rim by the use of the air filling apparatus 10 will be explained by referring to FIGS. 3a to 3c. It is assumed that the tire 36 has been previously mounted on the rim 38.

First, the tire 36 mounted on the rim 38 is arranged on the table 12, and the seal member 20 of the inner cylinder member 14 is brought into coaxially engaged with the flange 38a of the rim 38 in the air-tight manner by actuating the associated cylinder (not shown). On the other hand, the annular end face 26 of the outer cylinder member 16 inclined to the table 12 is also brought into engaged with the side rubber of the tire 36 in the airtight manner by actuating the associated cylinders. By further actuating the cylinders, bead portions of the tire are urged toward the table 12 to form an annular space communicating with the internal space of the tire between the rim 38 and the bead portion 40 of the tire.

Thereafter, the pressurized air is supplied into the air-tight space 32 through the supply tube 34 so that the pressurized air is fed into the interior of the tire 36 through the annular space. In this case, the annular end face of the outer cylinder member 16 engaging the side surface rubber of the tire in the air-tight manner is inclined to the rotating axis of the tire. Therefore, the right portion of the tire being filled with the pressurized air viewed in FIG. 3a is higher from the table 12 or nearer to the inner cylinder member 14 than the left portion of the tire.

The outer cylinder member 16 is then moved away from the table 12 by actuating the associated cylinder, while the inner cylinder member 14 is maintained in air-tight contact with the flange 38a of the rim. The tire has been prevented from free expansion by the inclined annular end face of the outer cylinder member 16. The movement of the outer cylinder member 16 permits the tire to expand so that the part of the bead portion positioned nearer to the inner cylinder member 14 rides over the hump of the rim 38 and contacts the bead base and flange of the rim 38. This action progresses along the whole circumference of the rim to bring the bead portion into contact with the bead base and the flange of the rim, as the pressurized air is continuously supplied into the interior of the tire and the outer cylinder member 16 is further moved away from the table 12. This state is shown in FIG. 3b.

During such a movement of the bead portion of the tire, the bead portion need not ride over the hump of the rim simultaneously along its whole circumference. It is sufficient that the part of the bead portion assuming an oblique position relative to the hump rides over the hump of the rim little by little. Therefore, the force required to cause the bead portion to ride over the hump is much smaller than that in the prior art apparatus in which an entire bead portion simultaneously rides over the hump of a rim. In this case, moreover, there is no risk of leakage of the pressurized air because part of the bead portion not yet contacting the rim is kept in close contact with the annular end face 26 of the outer cylinder member 16.

The outer cylinder member 16 is further moved away from the table 12, so that the bead portion 40 of the tire progressively contact the rim until the bead portion comes into close contact with the entire circumference of the rim 38, when the side surface rubber of the tire is released from the engagement with the annular end face 26 of the outer cylinder member 16 as shown in FIG. 3c.

At this time, the supply of the pressurized air into the space 32 is cut off, while the cylinder associated with the inner cylinder member 14 is actuated to release the engagement between the seal member 20 of the inner cylinder member 14 and the flange of the rim. Thereafter, the tire 36 filled with the pressurized air is removed from the table 12 preparatory to the next air filling operation.

The inclined annular end face 26 of the outer cylinder member 16 opposite to the side surface of the tire is preferably inclined so as to have a difference in height of the order of 5 to 20 mm in the direction of the tire rotating axis. If the difference in height is less than 5 mm, it becomes difficult for the bead portion of a tire to ride over the hump of a rim little by little, with the result that bead portion is likely to be deformed. On the other hand, if the difference in height is more than 20 mm, it becomes difficult to maintain the air-tightness between the annular end face 26 of the outer cylinder member 16 and the side surface rubber of a tire, so that leakage of air becomes large.

In order to compare the apparatus according to the invention with the prior art apparatus, the following experiment was carried out. Tires of 195/60 R14 mounted on rims of 6-JJ×14 were filled with pressurized air of 2.0 kg/cm$^2$ by the use of the apparatus comprising the outer cylinder member having an inclined annular end face of a 15 mm difference in height according to the invention and the apparatus of the prior art shown in FIG. 1, respectively. Distances between rim flanges and rim lines of tire side surface rubbers were measured over the whole circumferences of the tires to compare uniformities of close contact therebetween. FIGS. 4a and 4b illustrate results of the apparatuses according to the invention and of the prior art, respectively. Solid lines in FIGS. 4a and 4b denote the results on the rim lines positioned on the outer side of the vehicle, while broken lines illustrate the results on the rim lines located on the inner side of the vehicle.

It is clear from the results shown in FIGS. 4a and 4b that the tires filled with pressurized air by means of the apparatus according to the invention can bring bead portions of them into close contact with the rims more uniformly than those of tires filled with pressurized air by the apparatus of the prior art.

As can be seen from the above explanation, the apparatus according to the invention can bring bead portions of tires into close contact with rims uniformly without causing any deformation of the bead portions. Therefore, it is possible to eliminate various problems such as vibrations, air leakage and the like due to deformations of the bead portions of tires.

While the invention has been particularly shown and described with reference to preferred embodiments thereof, it will be understood by those skilled in the art that the foregoing and other changes in form and details can be made therein without departing from the spirit and scope of the invention.

What is claimed is:

1. An air filling apparatus for a tire, comprising a table for supporting thereon a tire mounted on a rim, an inner cylinder member having an end face lying in a plane parallel to said table and air-tightly engageable with a flange of the rim, an outer cylinder member slidably supported by said inner cylinder member and air-tightly engageable with a side rubber of the tire means for filling pressurized air into the tire, and means for moving the outer cylinder member relative to the inner cylinder member in an axial direction perpendicular to said table, wherein an end face of the outer cylinder member air-tightly engageable with the side rubber of the tire is inclined relative to said axial direction.

2. The air filling apparatus as set forth in claim 1, wherein said end face of the outer cylinder member is an inclined in height 5 to 20 mm in said axial direction.

* * * * *